(12) United States Patent
Liu et al.

(10) Patent No.: US 10,754,379 B2
(45) Date of Patent: *Aug. 25, 2020

(54) USER-MOUNTED DEVICE CALIBRATION USING EXTERNAL DATA (71) Applicant: MICROSOFT TECHNOLOGY LICENSING, LLC, Redmond, WA (US)

(72) Inventors: James Chia-Ming Liu, Bellevue, WA (US); Benjamin Isaac Vaught, Seattle, WA (US); Paolo Malabuyo, San Francisco, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 816 days.

This patent is subject to a terminal disclaimer.

(21) Appl. No.: 15/400,591

(22) Filed: Jan. 6, 2017

(65) Prior Publication Data

US 2017/0115690 A1 Apr. 27, 2017

Related U.S. Application Data (63) Continuation of application No. 13/692,855, filed on Dec. 3, 2012, now Pat. No. 9,588,935, which is a (Continued)

(51) Int. Cl.
G06F 1/16 (2006.01)
G02B 27/00 (2006.01)
(Continued)

(52) U.S. Cl.
CPC ........... *G06F 1/163* (2013.01); *G01C 25/005* (2013.01); *G02B 27/0093* (2013.01); (Continued)

(58) Field of Classification Search
CPC combination set(s) only.
See application file for complete search history.

(56) References Cited

U.S. PATENT DOCUMENTS 6,753,828 B2 6/2004 Tuceryan et al.
7,593,024 B2 9/2009 Andrews et al.
(Continued)

OTHER PUBLICATIONS

"Non Final Office Action Issued in U.S. Appl. No. 13/692,855", dated Jun. 21, 2016, 7 Pages.
(Continued)

*Primary Examiner* — Janet L Suglo
(74) *Attorney, Agent, or Firm* — Shook, Hardy & Bacon LLP (57) ABSTRACT Systems, methods, and computer media for calibrating user-mounted devices are provided. An external device capable of providing calibration data to a user-mounted device worn by a user is identified. An identification acknowledgement is received from the external device. A device calibration mode is entered in which calibration data describing the user-mounted device is received by the user-mounted device. The calibration data is based at least in part on sensor data acquired and normalized by the external device. The calibration data is then received. The calibration data includes at least one determined pose or body measurement of the user and a calculated alignment of the user-mounted device relative to the user. The user-mounted device is calibrated using the received calibration data.

20 Claims, 8 Drawing Sheets

Related U.S. Application Data continuation of application No. 13/159,888, filed on Jun. 14, 2011, now abandoned.

(51) Int. Cl.
*G02B 27/01* (2006.01)
*G01C 25/00* (2006.01)
*G06F 15/00* (2006.01)

(52) U.S. Cl.
CPC ....... *G02B 27/017* (2013.01); *G02B 27/0172* (2013.01); *G06F 15/00* (2013.01); *G02B 2027/014* (2013.01); *G02B 2027/0138* (2013.01); *G02B 2027/0178* (2013.01); *G02B 2027/0187* (2013.01); *G09G 2320/0693* (2013.01)

(56) References Cited

U.S. PATENT DOCUMENTS

| | | |
|---|---|---|
| 2002/0095265 A1 | 7/2002 | Satoh |
| 2002/0105484 A1 | 8/2002 | Navab |
| 2002/0140709 A1 | 10/2002 | Sauer |
| 2005/0073531 A1 | 4/2005 | Kuroki et al. |
| 2006/0258929 A1 | 11/2006 | Goode et al. |
| 2007/0121423 A1 | 5/2007 | Rioux |
| 2010/0138798 A1* | 6/2010 | Wilson ............ G06F 3/017 715/863 |
| 2010/0295924 A1 | 11/2010 | Miyatani et al. |

OTHER PUBLICATIONS

"Notice of Allowance Issued in U.S. Appl. No. 13/692,855", dated Oct. 27, 2016, 10 Pages.

Figl, et al., "Automatic Calibration of an Optical See Through Mead Mounted Display for Augmented Reality Applications in Computer Assisted Interventions", In proceedings Medical Imaging 2004: Visualization, Image-Guided Procedures, and Display, vol. 5367, May 5, 2004, 8 pages.

Handa, et al., "Development of Head-mounted Display with Eye-gaze Detection Function for the Severely Disabled", in IEEE International Conference on Virtual Environments, Human-Computer Interfaces ,and Measurement Systems, Jul. 14-16, 2008, 5 pages.

* cited by examiner

USER-MOUNTED DEVICE CALIBRATION USING EXTERNAL DATA

RELATED APPLICATION

This patent application is a continuation of U.S. application Ser. No. 13/692,855, filed on Dec. 3, 2012, which is a continuation of U.S. application Ser. No. 13/159,888, filed Jun. 14, 2011, each of which is incorporated herein by reference in the entirety.

BACKGROUND

Wearable computing devices, also known as user-mounted devices, have begun to increase in popularity in recent years. User-mounted devices typically include outward-facing sensors that gather data about the user's environment. User-mounted devices, and particularly head-mounted devices (HMDs) are commonly integrated into gaming systems. User-mounted devices can also be used for a variety of other computing tasks.

The sensors in typical user-mounted devices face outward and are not able to gather sufficient data about the user and the position of the user-mounted device relative to the user for proper device calibration. Additionally, unlike fixed devices, because user-mounted devices are worn by a user, the devices are frequently in motion and change orientation as the user moves. Movement may also cause user-mounted devices to change position relative to the user, potentially requiring frequent recalibration of the devices.

SUMMARY

Embodiments of the present invention relate to systems, methods, and computer media for calibrating a user-mounted device. Using the systems and methods described herein, an external device capable of providing calibration data to a first user-mounted device is identified. The first user-mounted device is worn by a first user. An identification acknowledgement is received from the external device. A device calibration mode is entered in which calibration data describing the first user-mounted device is received by the first user-mounted device, wherein the calibration data is based at least in part on sensor data acquired and normalized by the external device. The calibration data is then received. The calibration data includes at least one determined pose or body measurement of the first user and a calculated alignment of the first user-mounted device relative to the first user. The first user-mounted device is calibrated using the received calibration data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Embodiments of the present invention are described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" or "module" etc. might be used herein to connote different components of methods or systems employed, the terms should not be interpreted as implying any particular order among or between various steps herein disclosed unless and except when the order of individual steps is explicitly described.

Embodiments of the present invention relate to systems, methods, and computer media for calibrating a user-mounted device. In accordance with embodiments of the present invention, a user-mounted device worn by a user is calibrated based on sensor data acquired by an external device. Two users, each wearing a user-mounted device, can jointly calibrate, with each user's device acquiring sensor data describing the other user.

As discussed above, user-mounted devices typically include outward-facing sensors. While outward-facing sensors are desirable for gathering information about the user's environment, the sensors are not able to gather much if any information about the user-mounted device itself or the user wearing the device. Proper user-mounted device calibration is difficult or impossible to achieve without sufficient data describing the user and the user-mounted device.

External data can be relied on to provide the information used for calibration. Various external devices have sensors capable of gathering data describing the user and the user-mounted device. A user-mounted device recognizes or is recognized by an external device and enters a device calibration mode. Device recognition and entrance of device calibration mode may occur via explicit user action or may occur automatically without user input and/or knowledge. The external device acquires sensor data describing the user-mounted device. The acquired sensor data is normalized to account for the external device's location, orientation, motion, or other factors. Calibration data based on the acquired and normalized sensor data is provided to the user-mounted device. The user-mounted device is then calibrated based on the calibration data.

The external device acquiring and normalizing sensor data may be another user-mounted device worn by another user. In such situations, each user-mounted device may act as the external device and provide calibration data to the other. Thus, if two users are each wearing a user-mounted device, the two users can enter a joint calibration mode and each provide calibration data to the other, allowing both devices to calibrate.

Calibration data for a user-mounted device may also include data gathered by the user-mounted device itself. For example, a user-mounted device may include eye-tracking sensors, and the calibration data may include eye-tracking data gathered by the user-mounted device.

In one embodiment of the present invention, an external device capable of providing calibration data to the first user-mounted device is identified. An identification acknowledgement is received from the external device. A device calibration mode is entered in which calibration data describing the first user-mounted device is received by the first user-mounted device. The calibration data is based at least in part on sensor data acquired and normalized by the external device. The calibration data is received. The calibration data includes at least one determined pose or body measurement of the first user and a calculated alignment of the first user-mounted device relative to the first user. The first user-mounted device is calibrated using the received calibration data.

In another embodiment, a session component communicates with an external device to enter a device calibration mode in which calibration data describing the first user-mounted device is received by the first user-mounted device. The calibration data is based at least in part on sensor data acquired by the external device. An intake component receives the calibration data. The calibration data includes at least one determined pose or body measurement of the first user and a calculated alignment of the first user-mounted device relative to the first user. A calibration component calibrates the first user-mounted device using the received calibration data.

In still another embodiment, a second user-mounted device worn by a second user is identified. The second user-mounted device is capable of providing calibration data to the first user-mounted device. An identification acknowledgement is received from the second user-mounted device. A joint device calibration mode is entered in which first calibration data describing the first user-mounted device is received by the first user-mounted device and second calibration data describing the second user-mounted device is transmitted by the first user-mounted device. The first calibration data is based at least in part on first sensor data acquired and normalized by the second user-mounted device, and the second calibration data is based at least in part on second sensor data acquired and normalized by the first user-mounted device. The first calibration data is received. The first calibration data includes at least one determined pose or body measurement of the first user and a calculated alignment of the first user-mounted device relative to the first user. The first sensor data includes data from at least one of: an inertial measurement unit (IMU); a red, green, blue (RGB) camera; a depth sensor; assisted GPS; or a microphone. The first user-mounted device is calibrated using the first calibration data The second sensor data is acquired. The second sensor data includes data from at least one of: an IMU; an RGB camera; a depth sensor; assisted GPS; or a microphone. The second sensor data is normalized. Based at least in part on the normalized second sensor data, (1) pose and body measurements of the second user are determined and (2) an alignment of the second user-mounted device relative to the second user is calculated. The second calibration data is transmitted. The second calibration data includes the at least one determined pose and body measurement of the second user and the calculated alignment of the second user-mounted device.

Figure 1:
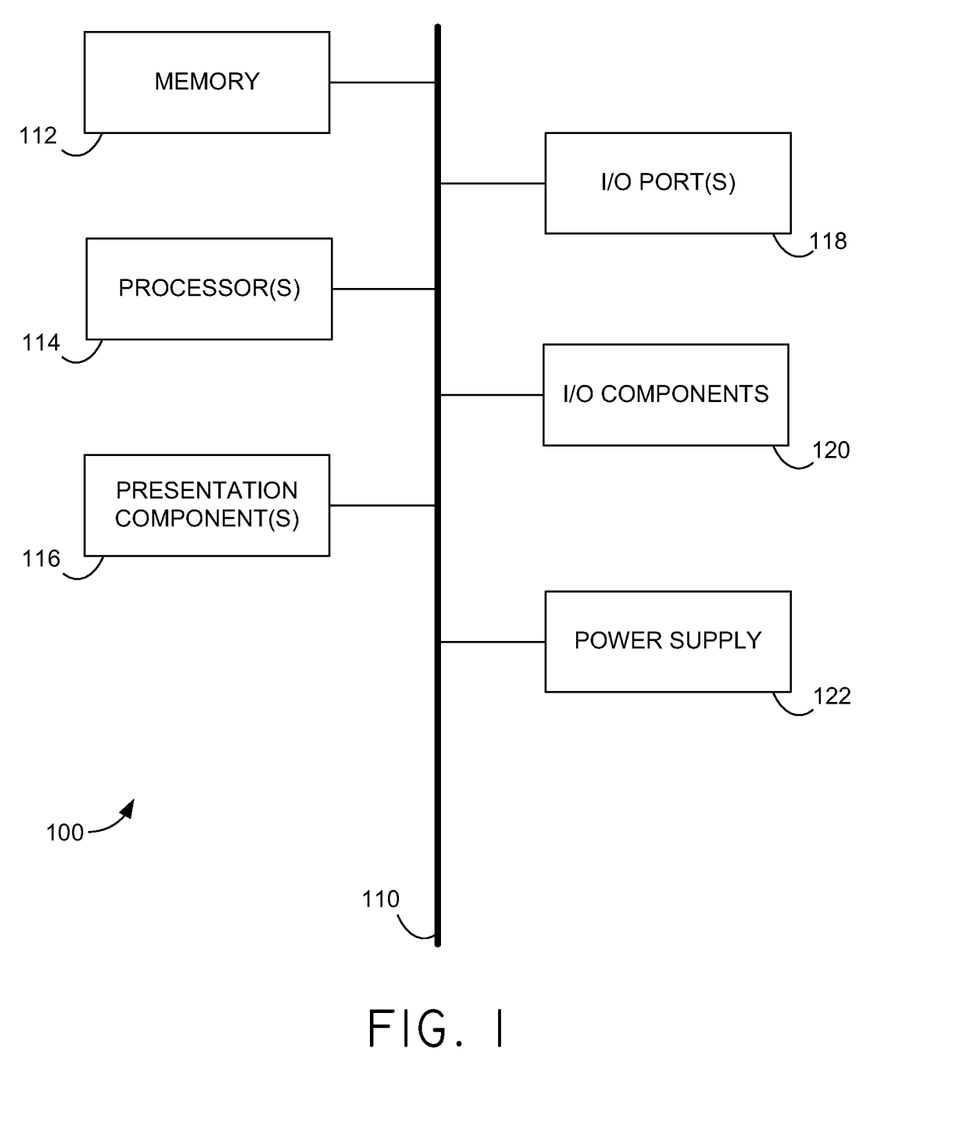
FIG. 1 is a block diagram of an exemplary computing environment suitable for use in implementing embodiments of the present invention.

Having briefly described an overview of some embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present invention may be practiced in a variety of system configurations, including hand-held devices, consumer electronics, general-purpose computers, more specialty computing devices, etc. Embodiments of the present invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. It is recognized that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Communication media typically embodies computer-readable instructions, data structures, program modules, or other data in a modulated data signal such as a carrier wave. The term "modulated data signal" refers to a propagated signal that has one or more of its characteristics set or changed to encode information in the signal. By way of example, and not limitation, communication media includes wired media, such as a wired network or direct-wired connection, and wireless media such as acoustic, RF, infrared, radio, microwave, spread-spectrum, and other wireless media. Combinations of the above are included within the scope of computer-readable media.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As discussed previously, embodiments of the present invention relate to systems, methods, and computer media for calibrating a user-mounted device. Embodiments of the present invention will be discussed with reference to FIGS. 2-8.

Figure 2:
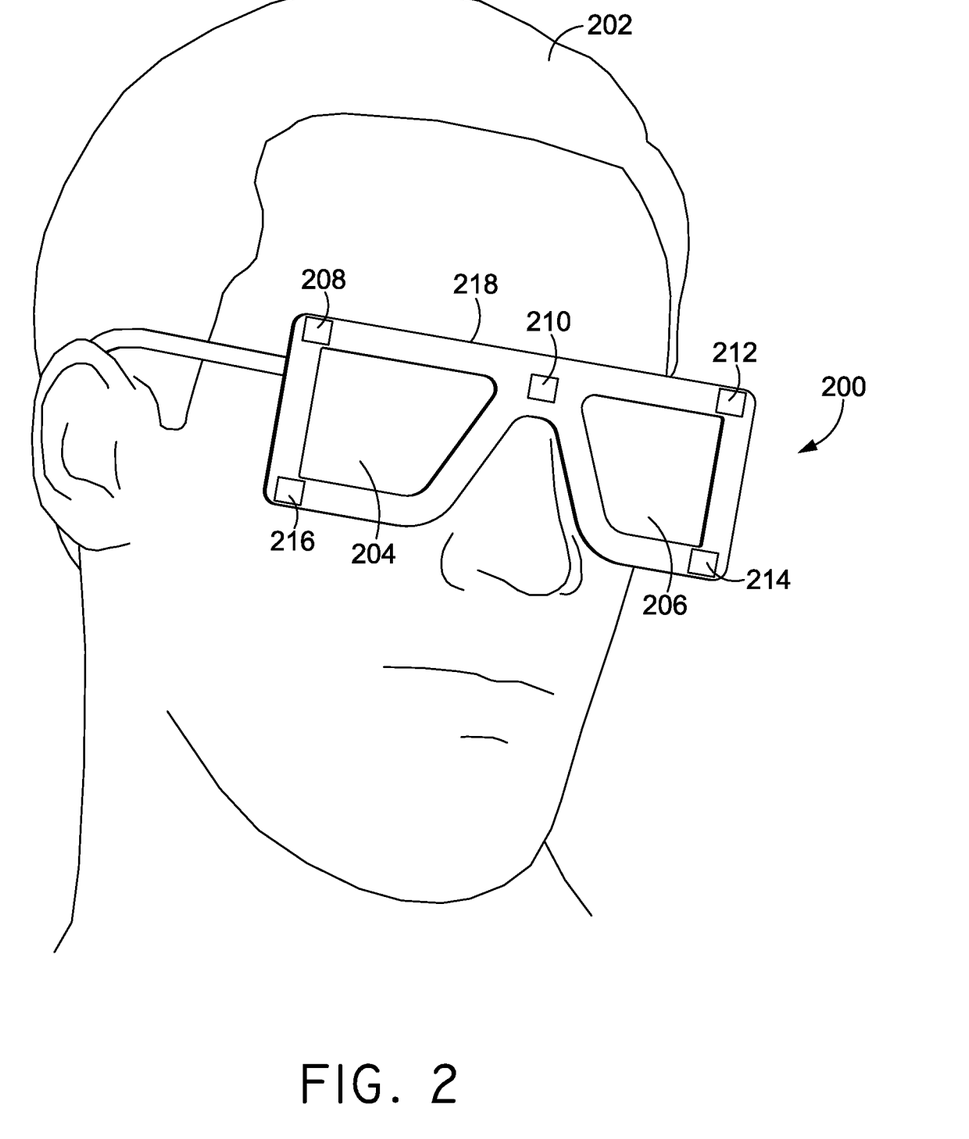
FIG. 2 is a perspective view of an exemplary user-mounted device worn by a user in accordance with embodiments of the present invention.

FIG. 2 illustrates an exemplary user-mounted device 200 worn by a user 202. User-mounted device 200 is a head-mounted device (HMD), also known as a head-mounted display. User-mounted device 200 is a "sensor-rich" device that includes various sensors for gathering information about the environment around the user. User-mounted device 200 is a "see-through" device in which user 202 views the surrounding environment using his own visual sense by looking through displays 204 and 206 but is also provided various additional information on displays 204 and 206.

User-mounted device 200 includes sensors 208, 210, 212, 214, and 216. Sensors 208, 210, 212, 214, and 216 are outward-facing sensors that gather information describing the user's environment and surroundings. These sensors are shown incorporated into frame 218 of user-mounted device 200 at various points, but it is contemplated that sensors can be incorporated into user-mounted device 200 at any location. Sensors 208, 210, 212, 214, and 216 may be any combination of sensors, including: depth sensors, cameras, inertial measurement units (IMUs), assisted GPS sensors, microphones, or other sensors. Depth sensors may be infrared (IR) sensors that measure time of flight between a transmitted signal and a received reflection or retransmission. Cameras may be IR or visible spectrum, black and white or red-green-blue (RGB) cameras. In some embodiments, the parallax between images from two different cameras can be used to measure depth much as a person's two eyes provide depth perception. Microphones may be directional. In some embodiments, user consent may first be required prior to gathering and/or using data from sensors such as GPS or assisted GPS that could present privacy concerns.

Other sensors are also contemplated. Some sensors, such as RGB cameras and depth sensors include an area for receiving input that is visible by an observer looking at user-mounted device 200. Other sensors, such as an IMU, can be embedded in frame 218 such that the sensor is not visible by an observer. An IMU measures inertial acceleration and typically incorporates the functionality of accelerometers, gyroscopes, magnetometer, and other devices. In one embodiment, an IMU measurement of inertial acceleration has six degrees of freedom.

User-mounted device 200 may also include one or more eye-tracking calibration sensors, not shown in FIG. 2. Eye-tracking sensors typically track the movement of the pupil or other portions of the eye or the area around the eye to determine the direction of a user's gaze. This may be accomplished, for example, using IR or RGB cameras aimed at the user's eyes.

Electronics and computer media for processing data acquired by sensors 208, 210, 212, 214, and 216 may be embedded in frame 218 of user-mounted device 200. User-mounted device 200 can communicate wirelessly with external devices via, for example, Bluetooth® or other technology. (Bluetooth is a registered trademark of the Bluetooth Special Interest Group.) In some embodiments, acquired data is transmitted wirelessly to a separate device for processing. User-mounted device 200 is shown resembling a pair of glasses for simplicity. The actual design of any particular user-mounted device and the number and arrangement of sensors may vary depending upon the sensors included and desired function. Additionally, although user-mounted device 200 is an HMD, other user-mounted devices are contemplated, worn on the user's head or elsewhere. In one embodiment, two RGB cameras, one on each side of user-mounted device 200 and an IR depth sensor are among the sensors included in user-mounted device 200.

Figure 3:
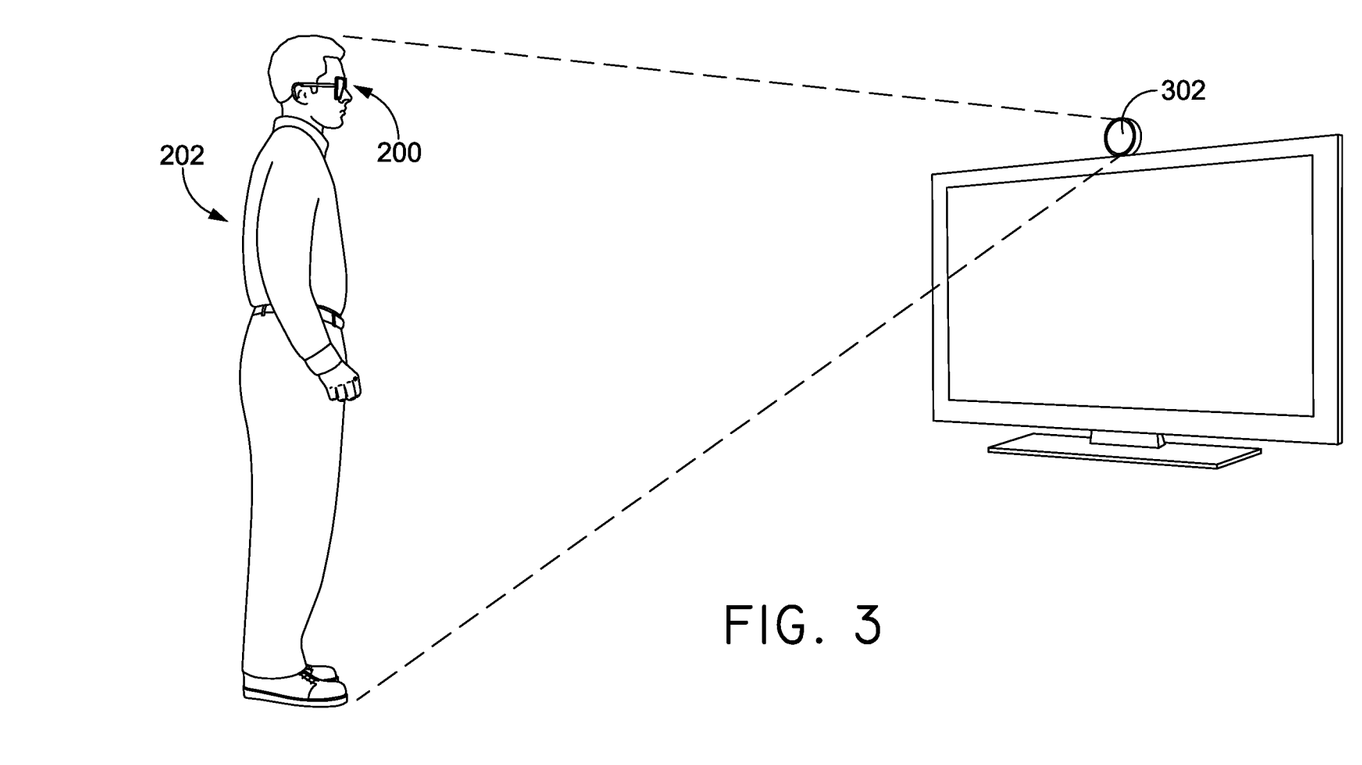
FIG. 3 is a perspective view of an exemplary user-mounted device worn by a user interacting with an external device in accordance with embodiments of the present invention.

FIG. 3 illustrates user-mounted device 200 worn by user 202, shown in FIG. 2, interacting with an external device 302. External device 302 includes various sensors that acquire data describing user-mounted device 200 and user 202. External device 304 can then provide calibration data derived from the acquired sensor data to user-mounted device 200 for calibration purposes. As discussed above, user-mounted device 200 includes outward-facing sensors. Because user-mounted device 200 cannot "see" where it is in relation to user 202 and has no means to determine the size and position of user 202, proper calibration of user-mounted device 200 is difficult to achieve without external input. External device 302 provides sufficient data for proper calibration. Without proper calibration, it is difficult or impossible for user-mounted device 200 to present accurate information about the user's environment to user 202.

Figure 4:
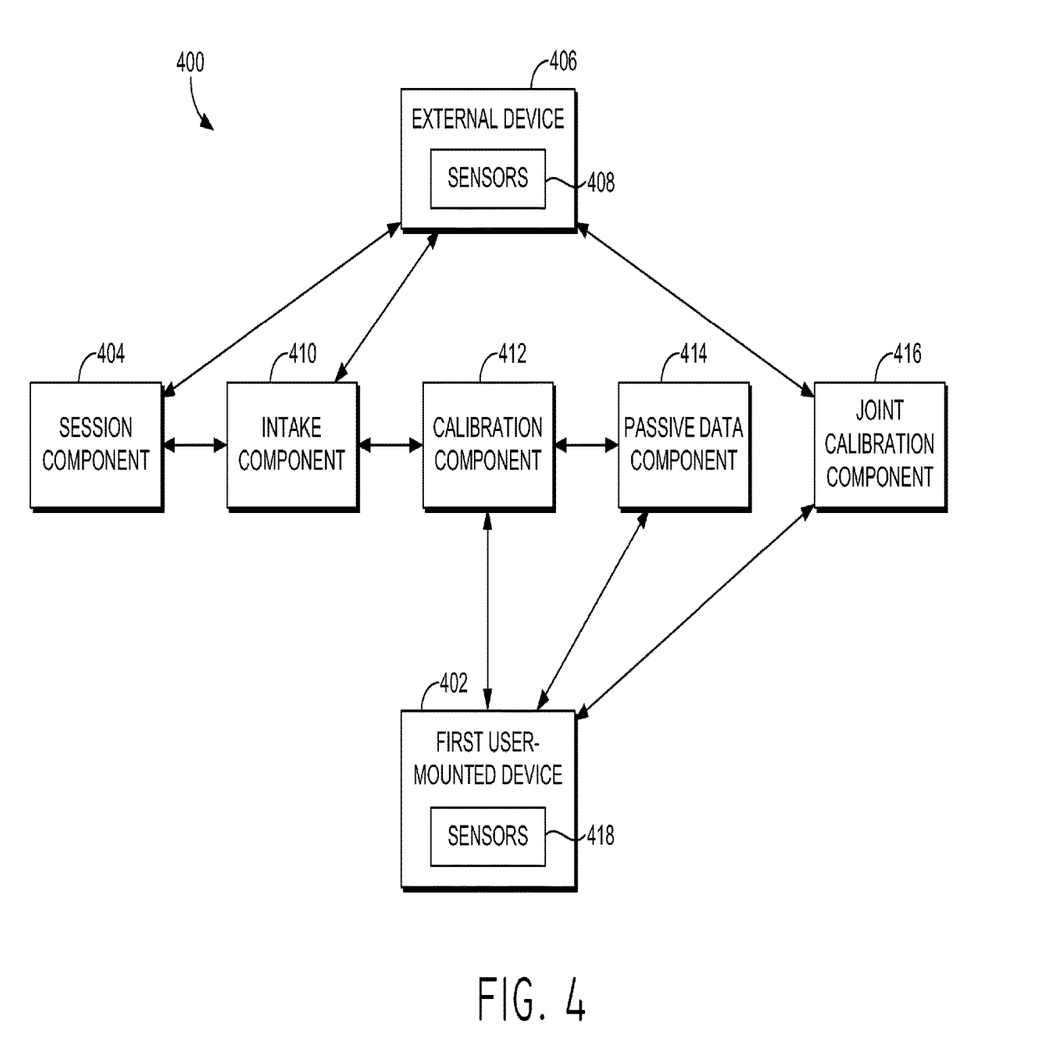
FIG. 4 is a block diagram of an exemplary user-mounted device calibration system in accordance with embodiments of the present invention.

FIG. 4 is a block diagram of an exemplary user-mounted device calibration system 400 for calibrating a first user-mounted device 402 worn by a first user. Session component 404 communicates with an external device 406 to enter a device calibration mode in which calibration data describing first user-mounted device 402 is received by first user-mounted device 402. The calibration data is based at least in part on sensor data acquired by sensors 408 of external device 406. External device 406 can be a variety of devices, including but not limited to: a device that remains in a fixed location, such as a motion detection and camera system integrated with a gaming system or webcam; another user-mounted device such as an HMD; or a non-wearable computing device such as a smart phone or laptop that is configured to communicate with first user-mounted device 402. In one embodiment, external device 406 is a device that remains in a fixed location or another user-mounted device worn by a sales clerk in a retail store such that when a customer purchases a user-mounted device, the customer can have his device calibrated using external device 406. The calibration data can also include eye-tracking data generated by first user-mounted device 402. That is, in some embodiments, a user-mounted device receives calibration data gathered by an external device as well as calibration data gathered by the user-mounted device itself.

Intake component 410 receives the calibration data. The received calibration data includes at least one determined pose or body measurement of the first user and a calculated alignment of first user-mounted device 402 relative to the first user. Calibration component 412 calibrates first user-mounted device 402 using the received calibration data.

In some embodiments, system 400 includes passive data component 414. Passive data component 414 receives input from a passive object. The input may be, for example, a captured reflection of first user-mounted device 402 or the first user or a captured image or video showing first user-mounted device 402 or the first user. In some embodiments, passive data component 414 transmits a sensor signal and receives feedback from the interaction of the sensor signal with a passive object. The feedback is considered by calibration component 412 in calibrating first user-mounted device 402. Examples of passive objects include mirrors, windows, and other reflective objects as well as monitors and displays. "Passive object" as used herein means that the object is not actively providing sensor data for use in calibration to first user-mounted device 402. Rather, first user-mounted device 402 is using its internal sensors 418 to detect something in the environment that can be used in calibration. For example, first user-mounted device 402 may use an RGB camera to capture a reflection of the first user and first user-mounted device 402 in a mirror. The mirror itself is not actively providing calibration data as external device 406 does. This provides first-user mounted device 402 data that device 402 could not acquire without the mirror or other external source.

In another embodiment, a display such as a computer monitor or smart phone display is the passive object. For example, a webcam or phone camera may capture an image or video of the first user wearing first user-mounted device 402, and first user-mounted device 402 can capture the image or video using an RGB camera. If the monitor or display is not configured to communicate with first user-mounted device 402 for calibration purposes, then the monitor or display is a passive object. In this way, a user without access to external device 406 can achieve some level of calibration using a smart phone, laptop, or other device that is not designed to communicate with first user-mounted device 402. Passive data can be used to supplement the calibration data received by intake component 410 to more precisely calibrate first user-mounted device 402. In some embodiments, passive data is used instead of the calibration data received by intake component 410.

In some embodiments, system 400 includes joint calibration component 416. Joint calibration component 416 allows first user-mounted device 402 to provide second calibration data to external device 406. The second calibration data is based on sensor data acquired by sensors 418 in first user-mounted device 402. The sensor data describes external device 406. For example, external device 406 may be a second user-mounted device. In such a case, first user-mounted device 402 acquires data with sensors 418 and provides the second calibration data to external device 406. In this way, external device 406 and first user-mounted device 402 help calibrate each other.

In some embodiments, joint calibration component 416 provides the second calibration data by normalizing the acquired sensor data that describes the second user-mounted device. Based at least in part on the normalized sensor data describing the second user-mounted device, pose and body measurements of the second user are determined. An alignment of the second user-mounted device relative to the second user is calculated. The second calibration data is then transmitted to the second user-mounted device, the second calibration data including at least one determined pose and body measurement of the second user and the calculated alignment of the second user-mounted device.

In FIG. 4, system components 404, 410, 412, 414, and 416 are shown as being external to first user-mounted device 402. In some embodiments, the components in system 400 are implemented on computer media contained within first user-mounted device 402. In other embodiments, the components in system 400 are implemented on a separate device or devices, and first user-mounted device 402 is a "dumb" device that simply receives data, transmits data, and presents data to a user. For example, a pocket device or device clipped to a user's belt may contain the majority or the processing power and system components, and such device may be in wireless communication with first user-mounted device 402.

Figure 5:
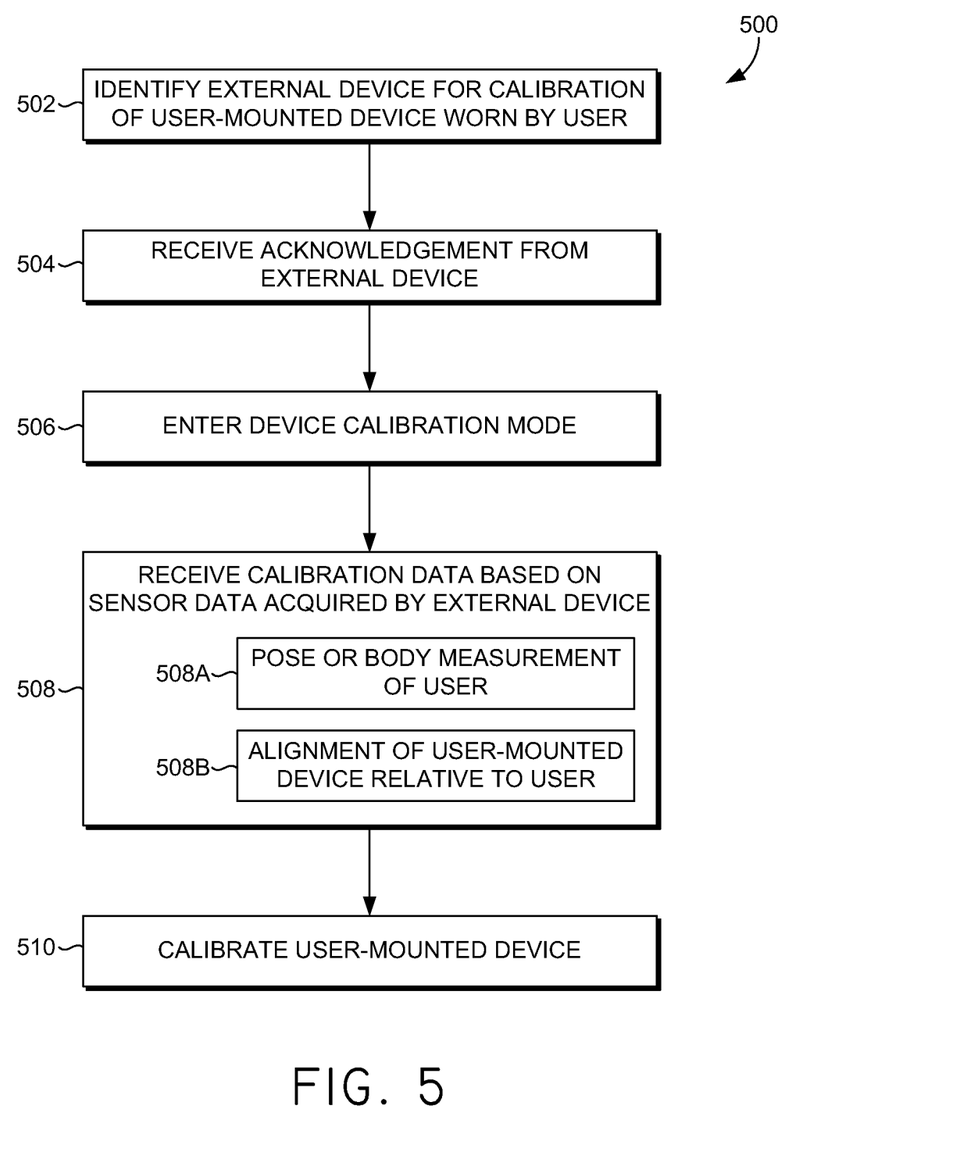
FIG. 5 is a flow chart of an exemplary method for calibrating a user-mounted device worn by a user in accordance with an embodiment of the present invention.

FIG. 5 is a flow chart illustrating an exemplary method 500 for calibrating a first user-mounted device worn by a user. In step 502, an external device capable of providing calibration data to the first user-mounted device is identified. In step 504, an identification acknowledgement is received from the external device. Step 504 may also be referred to as a "device handshake" or "device authentication." The "identification acknowledgement" discussed herein refers to the communication between devices in order to enter device calibration mode, regardless of which device initiates the communication.

This device handshake step may be accomplished through a variety of ways known to those having ordinary skill in the art. For example, the external device and the first user-mounted device may communicate via Bluetooth or other wireless technology. Both the external device and the first user-mounted device may periodically or continuously broadcast their presence and may periodically or continuously "listen" for other device broadcasts.

In step 506, a device calibration mode is entered in which calibration data describing the first user-mounted device is received by the first user-mounted device. The calibration data is based at least in part on sensor data acquired and normalized by the external device. The acquired sensor data is normalized to ensure that the calibration data provided to the first user-mounted device is accurate. The combination of data from various sensor data allows for extremely accurate calibration data. In some embodiments, the external device is a device in a fixed location and may require less normalization or less frequent normalization, because the device does not typically move.

The calibration data is received in step 508. The calibration data includes at least one determined pose or body measurement 508A of the first user and a calculated alignment 508B of the first user-mounted device relative to the first user. In some embodiments, alignment 508B of the first user-mounted device includes rotation of the first user-mounted device relative to the first user. The first user-mounted device is calibrated using the received calibration data in step 510.

In some embodiments, method 500 is performed as an automatic silent calibration such that the operation of the first user-mounted device is not adversely impacted by performance of method 500. For example, automatic silent calibration may occur during breaks in the movement of the first user or immediately after information is displayed to the first user that the first user will then need a moment to view and understand. In other embodiments, recalibration occurs when a specified time period, for example 30 seconds or two minutes, is exceeded. In other embodiments, recalibration occurs when a calibration threshold is exceeded. Each sensor included in the first user-mounted device may have an individual calibration threshold, and when the calibration threshold is exceeded, method 500 or particular steps of method 500 are performed again to ensure the first user-mounted device remains properly calibrated.

Figure 6:
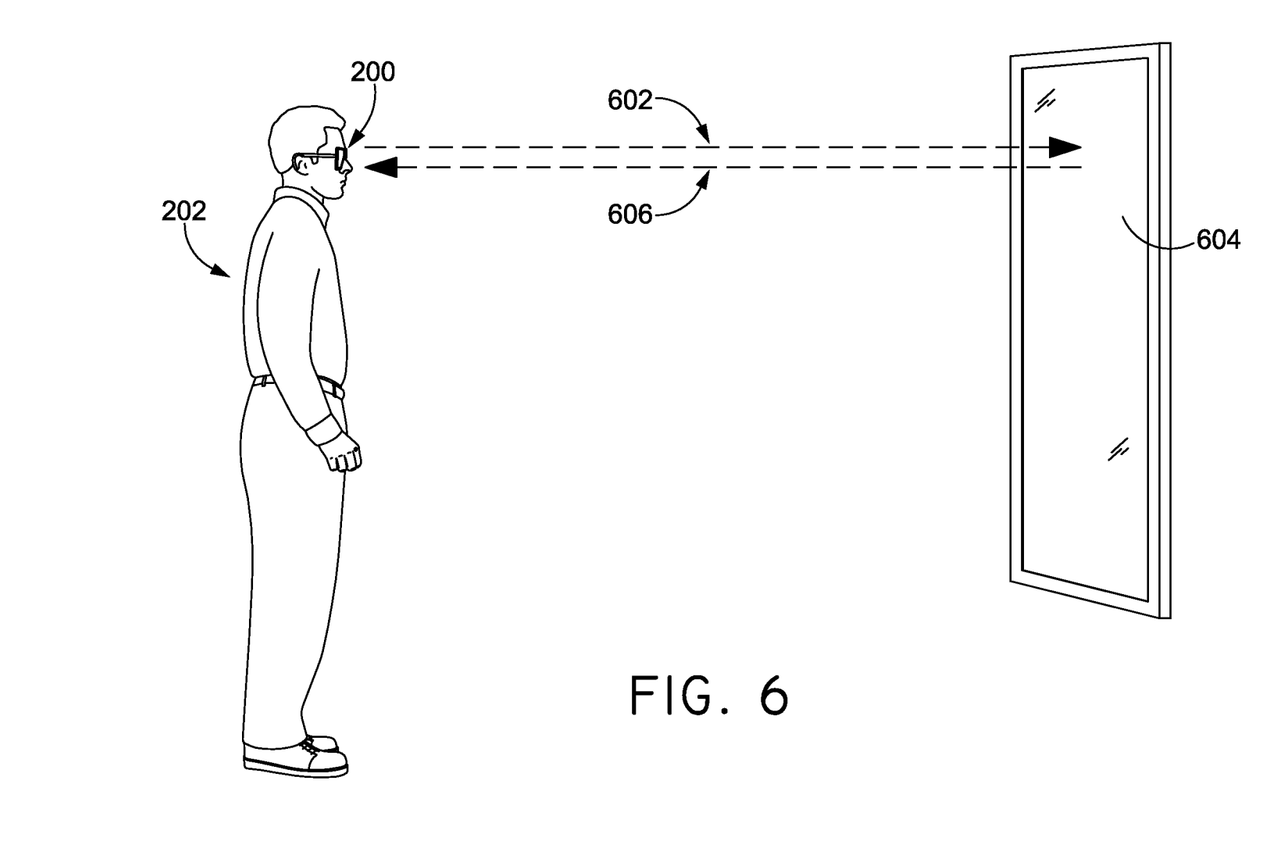
FIG. 6 is a perspective view of an exemplary user-mounted device worn by a user interacting with a passive object in accordance with embodiments of the present invention.

FIG. 6 illustrates user-mounted device 200 worn by user 202 interacting with a passive object 604. Passive object 604 is a mirror, but as discussed above, passive object 604 can be any object that is not actively providing user-mounted device 202 with calibration data. Sensors in user-mounted device 202 detect input from passive object 604. In some embodiments, user-mounted device 202 transmits a signal 602 and receives feedback 606 resulting from the interaction of the signal with passive object 604. In other embodiments, the received input is a captured reflection of user-mounted device 200 or user 202 or a captured image or video showing user-mounted device 200 or user 202. The input received from the passive object is considered in calibrating user-mounted device 200.

Figure 7:
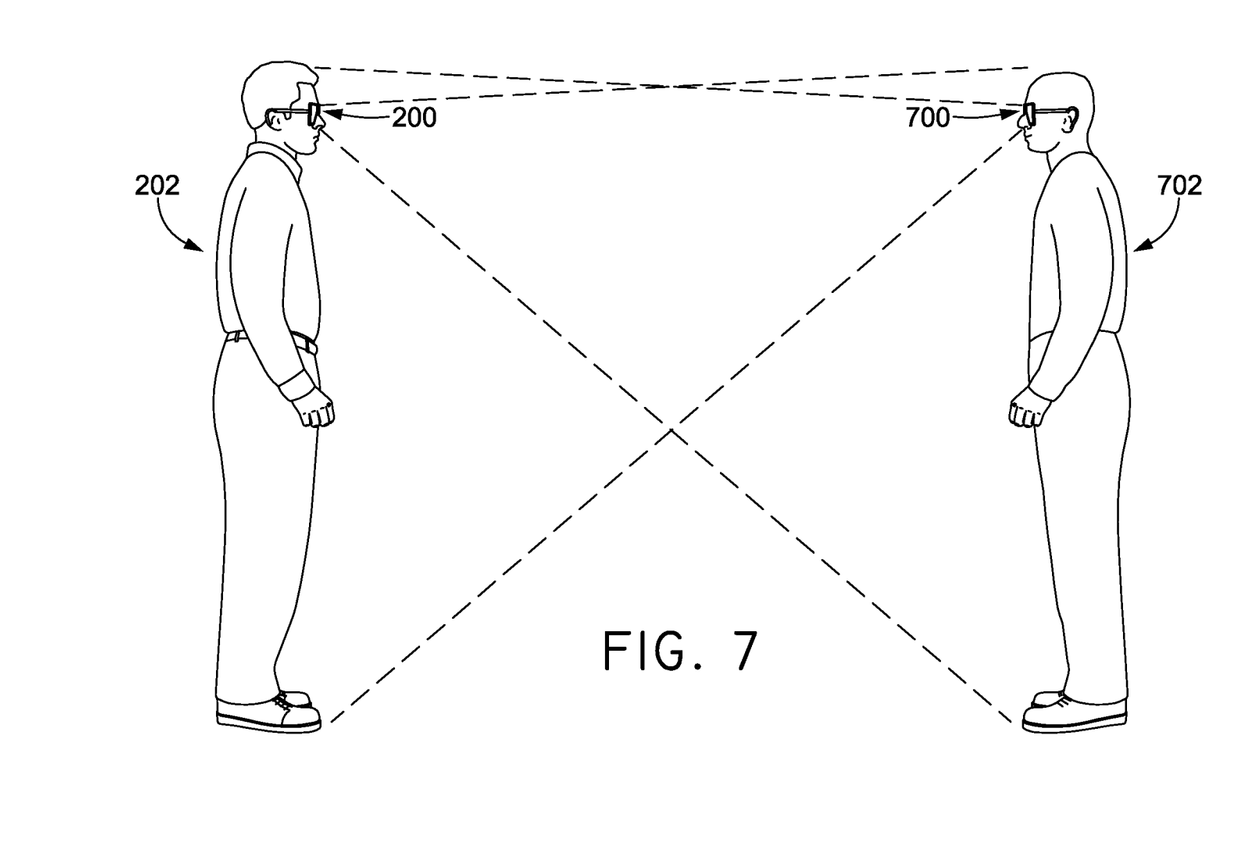
FIG. 7 is a perspective view of an exemplary first user-mounted device worn by a first user interacting with a second user-mounted device worn by a second user in accordance with embodiments of the present invention.

FIG. 7 illustrates user-mounted device 200 worn by user 202 interacting with a second user-mounted device 700 worn by a second user 702. In FIG. 7, both user-mounted device 200 and second user-mounted device 700 are HMDs. Second user-mounted device 700 has similar capabilities and functionality to user-mounted device 200. The sensors of second user-mounted device 700 acquire sensor data describing user 202 and user-mounted device 200. The sensors of user-mounted device 200 acquire sensor data describing second user 702 and second user-mounted device 700. Thus, FIG. 7 illustrates joint calibration where second user-mounted device 700 is the "external device" that provides calibration data to user-mounted device 200 and where user-mounted device 200 is the "external device" that provides calibration data to second user-mounted device 700. In some embodiments, calibration data is transmitted directly from second user-mounted device 700 to user-mounted device 200 and directly from user-mounted device 200 to second user-mounted device 700. In other embodiments, various intermediate devices are involved in the transmission of calibration data.

Figure 8:
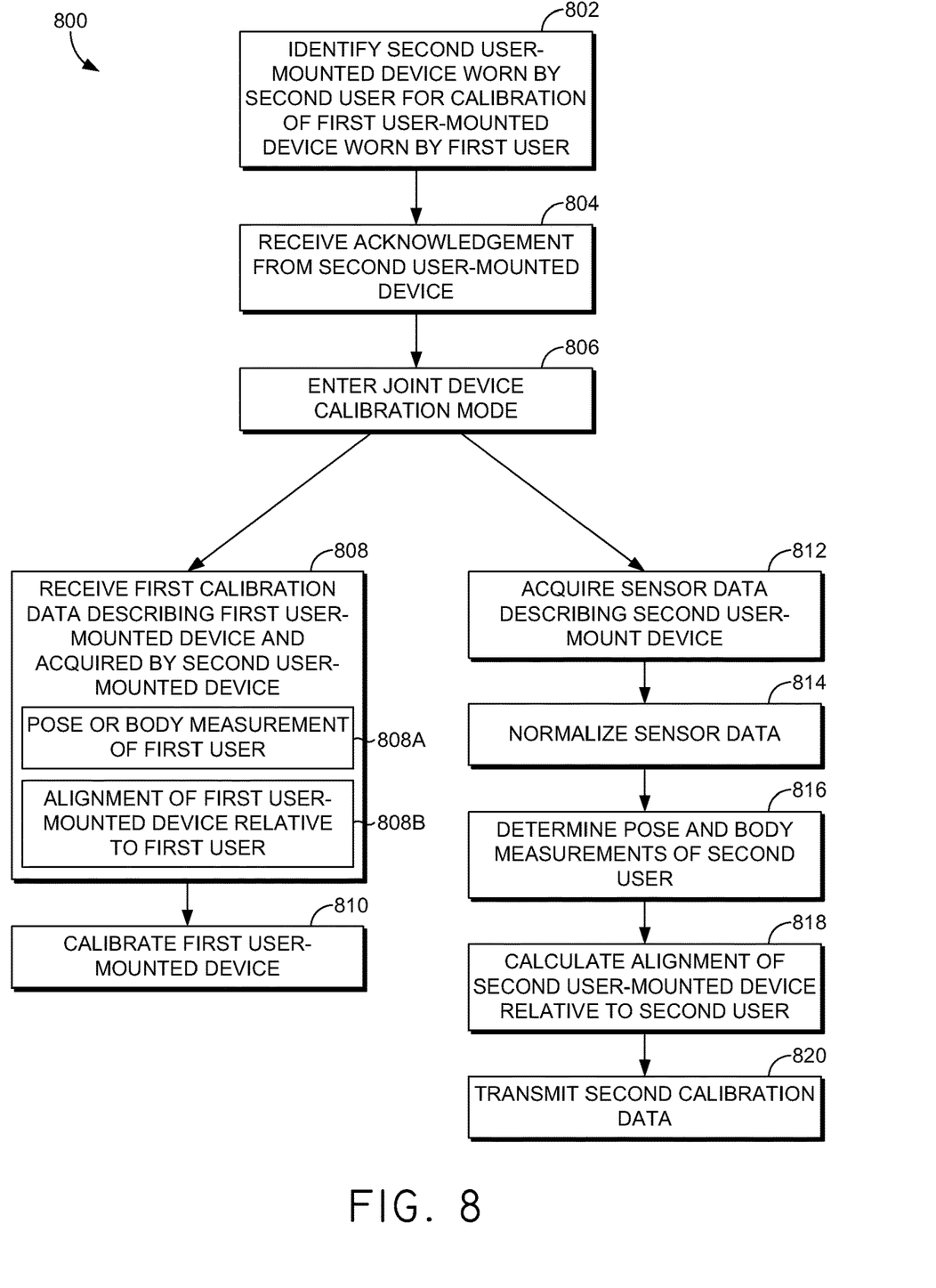
FIG. 8 is a flow chart of an exemplary method for joint calibration of two user-mounted devices in accordance with an embodiment of the present invention.

FIG. 8 illustrates a method 800 for joint calibration of two user-mounted devices, a first user-mounted device worn by a first user and a second user-mounted device worn by a second user. In step 802, the second user-mounted device worn by the second user is identified. The second user-mounted device is capable of providing calibration data to the first user-mounted device. In step 804, an identification acknowledgement is received from the second user-mounted device. A joint device calibration mode is entered in step 806. In the joint calibration mode, first calibration data describing the first user-mounted device is received by the first user-mounted device and second calibration data describing the second user-mounted device is transmitted by the first user-mounted device. The first calibration data is based at least in part on first sensor data acquired and normalized by the second user-mounted device. The second calibration data is based at least in part on second sensor data acquired and normalized by the first user-mounted device.

In step 808 the first calibration data is received. The first calibration data includes at least one determined pose or body measurement 808A of the first user and a calculated alignment 808B of the first user-mounted device relative to the first user. The first sensor data includes data from at least one of: an inertial measurement unit (IMU); a red, green, blue (RGB) camera; a depth sensor; assisted GPS; or a microphone. In step 810, the first user-mounted device is calibrated using the first calibration data.

The second sensor data is acquired in step 812. The second sensor data includes data from at least one of: an IMU; an RGB camera; a depth sensor; assisted GPS; or a microphone. In step 814, the second sensor data is normalized. In step 816, based at least in part on the normalized second sensor data, pose and body measurements of the second user are determined. In step 818, based at least in part on the normalized second sensor data, an alignment of the second user-mounted device relative to the second user is calculated. The second calibration data is transmitted in step 820. The second calibration data includes the at least one determined pose and body measurement of the second user and the calculated alignment of the second user-mounted device.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer storage devices storing computer-executable instructions for performing operations for calibrating a first user-mounted device worn by a first user, the operations comprising:
   receiving calibration data from an external device based at least in part on sensor data acquired and normalized by the external device, wherein the calibration data includes at least one determined pose or body measurement of the first user and the calibration data also includes an alignment of the first user-mounted device relative to the first user; and
   calibrating the first user-mounted device using the received calibration data.

2. The one or more computer storage devices of claim 1, wherein the operations are performed as an automatic silent calibration.

3. The one or more computer storage devices of claim 1, wherein the operations are repeated when at least one of a calibration threshold or a specified time period is exceeded.

4. The one or more computer storage devices of claim 1, wherein the alignment of the first user-mounted device includes rotation of the first user-mounted device relative to the first user.

5. The one or more computer storage devices of claim 1, wherein the sensor data includes data from at least one of: an inertial measurement unit (IMU); a red, green, blue (RGB) camera; a depth sensor; assisted GPS; or a microphone.

6. The one or more computer storage devices of claim 1, wherein the first user-mounted device is a head-mounted device.

7. The one or more computer storage devices of claim 1, wherein the external device is in a fixed location.

8. The one or more computer storage devices of claim 1, wherein the operations further comprise receiving input from a passive object.

9. The one or more computer storage devices of claim 8, wherein the input is one of: a captured reflection of the first user-mounted device or the first user or a captured image or video showing the first user-mounted device or the first user.

10. The one or more computer storage devices of claim 1, wherein the external device is a second user-mounted device worn by a second user.

11. The one or more computer storage devices of claim 10, wherein the calibration data is transmitted from the second user-mounted device to the first user-mounted device.

12. The one or more computer storage devices of claim 11, wherein the operations further comprise:
acquiring sensor data describing the second user-mounted device;
normalizing the sensor data describing the second user-mounted device;
based at least in part on the normalized sensor data describing the second user-mounted device, (1) determining pose and body measurements of the second user and (2) calculating an alignment of the second user-mounted device relative to the second user; and
transmitting second calibration data to the second user-mounted device, the second calibration data including at least one determined pose and body measurement of the second user and the calculated alignment of the second user-mounted device.

13. One or more computer storage devices storing computer-executable instructions for performing operations for calibrating a first user-mounted device worn by a first user, the operations comprising:
acquiring sensor data describing the first user-mounted device;
normalizing the sensor data describing the first user-mounted device;
based at least in part on the normalized sensor data describing the first user-mounted device, (1) determining at least one pose or body measurement of the first user and (2) calculating an alignment of the first user-mounted device relative to the first user; and
transmitting calibration data to the first user-mounted device, the calibration data including the at least one determined pose or body measurement of the first user and the calculated alignment of the first user-mounted device, wherein the first user-mounted device is calibrated using the calibration data.

14. The one or more computer storage devices of claim 13, wherein the alignment of the first user-mounted device includes rotation of the first user-mounted device relative to the first user.

15. The one or more computer storage devices of claim 13, wherein the sensor data includes data from at least one of: an inertial measurement unit (IMU); a red, green, blue (RGB) camera; a depth sensor; assisted GPS; or a microphone.

16. The one or more computer storage devices of claim 13, wherein the first user-mounted device is a head-mounted device.

17. The one or more computer storage devices of claim 13, wherein the operations are performed by an external device in a fixed location.

18. The one or more computer storage devices of claim 13, wherein the operations are performed by a second user-mounted device worn by a second user.

19. The one or more computer storage devices of claim 18, wherein the calibration data is transmitted from the second user-mounted device to the first user-mounted device.

20. A user-mounted device worn comprising:
one or more processors;
one or more computer storage media storing computer-useable instructions, that when used by the one or more processors, cause the one or more processors to:
receive calibration data from an external device based at least in part on sensor data acquired and normalized by the external device, wherein the calibration data includes at least one determined pose or body measurement of a user wearing the user-mounted device and the calibration data also includes an alignment of the user-mounted device relative to the user; and
calibrating the user-mounted device using the received calibration data.

* * * * *